United States Patent [19]
Henry, Jr. et al.

[11] Patent Number: 5,603,084
[45] Date of Patent: Feb. 11, 1997

[54] METHOD AND APPARATUS FOR REMOTELY PROGRAMMING A CELLULAR RADIOTELEPHONE

[75] Inventors: Raymond C. Henry, Jr., Raleigh, N.C.; Alan E. Sicher, Garland, Tex.; Anthony J. Sammarco, Garner, N.C.; Michael Parker; William R. Osborn, both of Cary, N.C.

[73] Assignee: Ericsson Inc., Research Triangle Park, N.C.

[21] Appl. No.: 397,583

[22] Filed: Mar. 2, 1995

[51] Int. Cl.$^6$ ............... H04Q 7/00; H04Q 9/00
[52] U.S. Cl. ............ 455/33.1; 455/89; 455/186.1; 455/186.2; 379/59
[58] Field of Search ............ 455/33.1, 54.1, 455/54.2, 88, 89, 186.1, 186.2; 379/58–60

[56] References Cited

U.S. PATENT DOCUMENTS

| | | | |
|---|---|---|---|
| 4,593,155 | 6/1986 | Hawkins | 455/88 |
| 4,817,190 | 3/1989 | Comroe et al. | |
| 4,864,599 | 9/1989 | Saegusa et al. | |
| 4,910,510 | 3/1990 | Davis et al. | |
| 5,020,091 | 5/1991 | Krolopp et al. | 379/58 |
| 5,046,082 | 9/1991 | Zicker et al. | 379/59 |
| 5,109,403 | 4/1992 | Sutphin | 379/59 |
| 5,179,373 | 1/1993 | John | |
| 5,212,809 | 5/1993 | Oka | 455/88 |
| 5,297,191 | 3/1994 | Gerszberg | 379/59 |
| 5,297,192 | 3/1994 | Gerszberg | 379/59 |
| 5,301,223 | 4/1994 | Amadon et al. | 379/58 |
| 5,381,138 | 1/1995 | Stair et al. | 340/825.44 |
| 5,386,455 | 1/1995 | Cooper | 379/58 |
| 5,544,225 | 8/1996 | Kennedy, III et al. | 379/59 |

FOREIGN PATENT DOCUMENTS

| | | |
|---|---|---|
| 0630167A2 | 12/1994 | European Pat. Off. |
| WO95/10921 | 4/1995 | WIPO |
| WO95/15065 | 6/1995 | WIPO |
| WO95/23487 | 8/1995 | WIPO |

OTHER PUBLICATIONS

International Search Report, PCT/US96/02787, Jul. 30, 1996.
Cellular Providers Explore Ways to Thwart PCS Market Efforts, *Advanced Wireless Communications*, Oct. 12, 1994.
CDMA Development Group Defines Instant Activation Process; First of Many Specs to be Developed, *Businesswire (BUSW)*, Sep. 28, 1994.
Silberg, ORA System to Speed Cellphone Activation, *HFD, Retailing Home Furnishings*, Apr. 11, 1994, p. 148.

Primary Examiner—Reinhard J. Eisenzopf
Assistant Examiner—Gertrude Arthur
Attorney, Agent, or Firm—Bell, Seltzer, Park & Gibson

[57] ABSTRACT

A cellular radiotelephone which includes a programmable memory location which is programmed with a unique initial identification number is remotely programmed by providing the initial identification number to a cellular system, and establishing a page from the cellular system to the radiotelephone using the initial identification number to identify the radiotelephone. Data, including a mobile identification number, is transmitted during the page, and the programmable memory location is programmed with the mobile identification number. Accordingly, the radiotelephone can be conveniently programmed after purchase from a remote location. In addition, the initial identification number may comprise predetermined digits chosen from the electronic serial number.

30 Claims, 4 Drawing Sheets

5,603,084

METHOD AND APPARATUS FOR REMOTELY PROGRAMMING A CELLULAR RADIOTELEPHONE

FIELD OF THE INVENTION

This invention relates to cellular radiotelephone systems and methods and more particularly to systems and methods for programming a cellular radiotelephone.

BACKGROUND OF THE INVENTION

Currently, most cellular radiotelephones must be manually programmed before the user can place a call, and this programming usually occurs after purchase. Programming may include the steps of providing the user's account information, such as credit and billing information, to the cellular system; waiting for the cellular system to establish an account for the user and assign a telephone number (Mobile Identification Number); and having a technician program the radiotelephone with the assigned telephone number. This process may take an hour or longer because the cellular system will typically run credit checks and other verifications prior to establishing an account. The step of establishing the account may also be delayed due to a backlog of new accounts. In addition, the telephone must remain with the technician until the phone is programmed. Accordingly, there exists a need in the art for a cellular radiotelephone system wherein the radiotelephone can be purchased and programmed remotely.

In U.S. Pat. No. 5,297,192, there is disclosed a method and apparatus for remotely programming a mobile data telephone. In this patent, downloading of Number Assignment Module ("NAM") designation parameters to a mobile data telephone set allows service authorization codes and activation to be entered remotely. A cellular mobile user first calls a remote cellular system center to establish a voice communication channel between the mobile data telephone and the center. The modem of the telephone is selectively bridged onto the voice communication channel to achieve data transfer between a source of data located at the remote center and the user's modem.

In U.S. Pat. No. 5,301,223, there is disclosed a method and apparatus for use in a mobile telephone rental system. In this patent, credit card information is communicated between the mobile telephone unit and a Voice Response System for customer registration and remote programming of mobile telephone unit features and NAM settings. Data read from the mobile telephone units are transmitted in variable length, encrypted and error protected Packet Data Units.

Notwithstanding the above identified patents, there continues to exist a need in the art for a method and apparatus for remotely programming a cellular radiotelephone wherein the radiotelephone can be purchased and programmed at the user's convenience. In particular, there exists a need for a remote programming method and apparatus wherein the user can provide any required account information, such as billing and credit information, at his or her convenience, and wherein the phone can be remotely programmed at a later time without requiring the interaction of the user or a technician. In addition, the method and apparatus should be implemented using existing cellular communications standards, systems and equipment.

SUMMARY OF THE INVENTION

It is therefore an object of the present invention to provide an improved method and apparatus for remotely programming a cellular radiotelephone after purchase.

It is another object of the present invention to provide a method and apparatus for remotely programming a cellular radiotelephone wherein information is provided to the cellular system and the radiotelephone is remotely programmed without requiring the interaction of the user or a technician.

It is still another object of the present invention to provide a method and apparatus for remotely programming a cellular radiotelephone that is compatible with existing cellular communications standards, systems and equipment.

These and other objects are provided according to the present invention by a method for remotely programming a cellular radiotelephone which includes a programmable memory location which is programmed with a unique initial identification number. Accordingly, a cellular system can use this initial identification number to access the radiotelephone remotely before it has been programmed with a mobile identification number. Preferably, the cellular system uses the initial identification number to send a page, including a mobile identification number, to the radiotelephone which can then program itself.

This method also allows the user to supply information to the cellular system remotely, and then have the phone programmed remotely. In addition, if the initial identification number comprises predetermined digits chosen from the electronic serial number, the initial identification number can be programmed during manufacture of the radiotelephone with relatively little additional cost or effort. Furthermore, the use of a standard page such as an SMS page over a digital control channel can reduce the need for modifications of a cellular system which operates according to this method.

In one embodiment, this method includes the steps of providing the initial identification number to a cellular system, and establishing a page from the cellular system to the radiotelephone using the initial identification number to identify the radiotelephone. Data is transmitted to the radiotelephone during the page, and the programmable memory location is reprogrammed with the Mobile Identification Number. Accordingly, the phone can be remotely programmed with a Mobile Identification Number ("MIN") chosen by the cellular system, thus eliminating the need to have a technician program the phone at a possibly inconvenient time or location.

The page may comprise the transmission of a Short Message Service ("SMS") data string which conforms to a data format defined by the Telecommunications Industry Association/Electronics Industry Association ("TIA/EIA") Interim Standard 136 ("IS-136") air interface standard, and the TIA/EIA IS-41C network standard. Because this page conforms to existing standards, the need to modify the cellular system to support this method of remote programming can be reduced.

The step of providing the initial identification number to the cellular system may include the steps of establishing a cellular radiotelephone communication from the radiotelephone to the cellular system, transmitting the initial identification number to the cellular system, and terminating the first cellular radiotelephone communication. This aspect of the invention allows the entire programming process to be conducted remotely. That is, once the phone is purchased, the user does not need to interact with anyone in person in order to have the phone programmed and ready for use. Also, because the first communication can be terminated, the user does not need to wait on the phone for the cellular system to establish the account.

The radiotelephone preferably comprises a non-programmable memory location for storing a unique telephone serial number, and the initial identification number preferably comprises predetermined digits chosen from the telephone serial number. The telephone serial number is most preferably the Electronic Serial Number ("ESN") of the radiotelephone, and the initial identification number most preferably comprises the 10 least significant digits of the Electronic Serial Number. As a result, the initial identification number can be programmed with a relatively unique number when it is manufactured. Because the Electronic Serial Number is a unique number already required by the FCC, the 10 least significant digits of this number can be determined and programmed into the programmable memory location by the manufacturer with relatively little additional effort or cost.

The method may also include the step of providing the telephone serial number, preferably the Electronic Serial Number, to the cellular system, and then comparing the telephone serial number and the initial identification number. If the initial identification number comprises predetermined digits of the telephone serial number, this comparison can indicate whether the radiotelephone has been previously programmed.

The method preferably includes the step of providing account information to the cellular system. This information can be used to establish a cellular service account for the radiotelephone. This information can also be used to determine whether such an account should be established.

In an alternate embodiment, the step of establishing a page can be replaced with the step of establishing a second cellular radiotelephone communication from the cellular system to the radiotelephone using the initial identification number to identify the radiotelephone. In this method, the cellular radiotelephone may include a second programmable memory location which is programmed to a first boolean value indicating that the first programmable memory location is programmed with the initial identification number, and the reprogramming step can be followed by the step of reprogramming the second programmable memory location to a second boolean value. Accordingly, the second programmable memory location can be used to determine whether the phone has been programmed. In addition, the reprogramming step can be followed by the step of transmitting a response to the cellular system to indicate successful reprogramming of the programmable memory location.

The present invention may also be embodied as a remotely programmable cellular radiotelephone including a non-programmable memory location for storing a unique telephone serial number, and a programmable memory location which is programmed with an initial identification number wherein the initial identification number comprises predetermined digits chosen from the telephone serial number. This radiotelephone also includes a transceiver for transmitting and receiving cellular radiotelephone communication signals to and from a cellular system, and a processor with a programming function for reprogramming the programmable memory location in response to receipt of a Mobile Identification Number from the transceiver so that the programmable memory location is programmed with the Mobile Identification Number. Accordingly, this radiotelephone can be remotely and conveniently programmed eliminating the need to have a technician program the phone.

The unique radiotelephone serial number is preferably the ESN of the radiotelephone, and the initial identification number preferably comprises the 10 least significant digits of the ESN. Accordingly, the determination and the programming of the serial number and the initial identification number can be accomplished when the phone is manufactured with relatively little additional cost or effort.

The transceiver preferably includes a transmitter for establishing a cellular radiotelephone communication from the radiotelephone to the cellular system. This transmitter can be used to transmit the initial identification number to the cellular system during the communication, as well as to transmit the serial number and any required account information. Accordingly, the programming process can be initiated by making a call on the un-programmed radiotelephone further reducing any inconvenience.

The transceiver also preferably includes a page receiver for receiving a page from the cellular system, wherein the radiotelephone is identified by the initial identification number and the page includes a Mobile Identification Number ("MIN") assigned by the cellular system. The page preferably comprises a Short Message Service Data string which is defined by the IS-136 air interface standard and the IS-41 C network standard. Because the radiotelephone can receive the MIN programming information from a standard page, this radiotelephone can be remotely programmed from a standard cellular system with relatively few modifications.

The radiotelephone may also include a second programmable memory location which is initially programmed with a first boolean value. In addition, the processor preferably includes a flagging function for reprogramming the second programmable memory location in response to the reprogramming of the first programmable memory location so that the second programmable memory location is programmed with a second boolean value. Accordingly, the second programmable memory location can be used to determine if the radiotelephone has been programmed.

DETAILED DESCRIPTION OF A PREFERRED EMBODIMENT

The present invention will now be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

Figure 1:
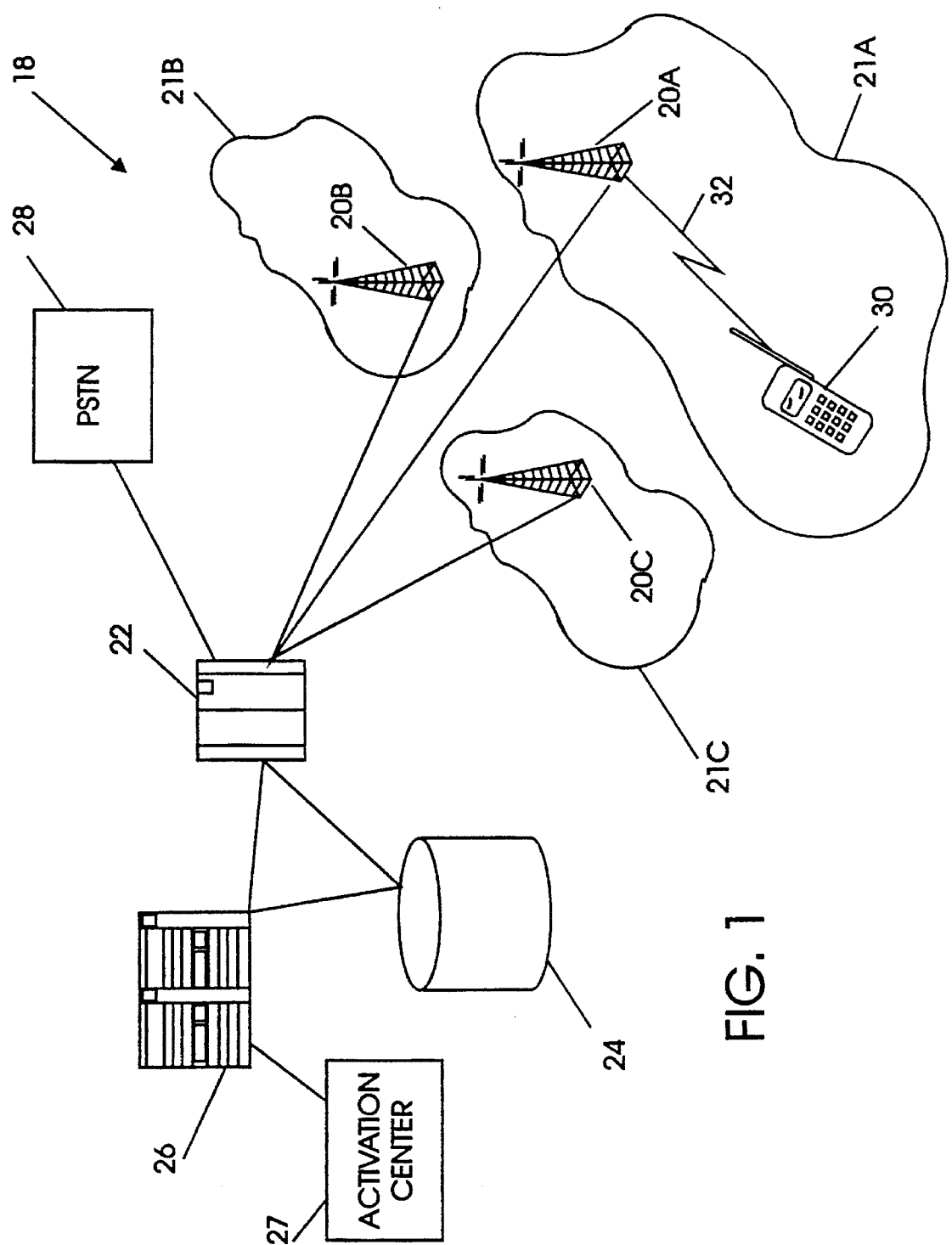
FIG. 1 illustrates a cellular system for remotely programming a cellular radiotelephone according to the present invention.

Referring now to FIG. 1, the cellular service provider maintains a cellular system 18 including a plurality of base stations $20_{A-C}$, with each base station defining a respective cell $21_{A-C}$; at least one Mobile Switching Center ("MSC") 22, also known as a mobile telephone switching office; a subscriber data base 24 including a Home Location Register ("HLR") and a Visited Location Register ("VLR"); and a message center 26 which may communicate with an activation center 27. Each of the base stations $20_{A-C}$ preferably conforms to the IS-56B standard, and sends and receives communications to and from the MSC 22 according to proprietary standards. Communications between the MSC 22, the subscriber data base 24, and the message center 26 preferably conform to the IS-41C standard. The IS-41C and IS-56B communications standards will be known to those having skill in the art. Other cellular communications standards may also be used. In addition, the cellular system is preferably connected to a Public Switched Telephone Network ("PSTN") 28 through the MSC 22.

In normal operation, the cellular system 18 provides cellular radiotelephone communications to and from the cellular radiotelephone 30 in a cell of the system. As shown, cellular radiotelephone communications between the radiotelephone 30 and the base station $20_A$ within cell $21_A$ are preferably provided over the wireless communications path 32 according to the IS-136 standard, and the radiotelephone preferably conforms to the IS-55B standard. Accordingly, the cellular system 18 can support radiotelephone communications between the radiotelephone 30 and the PSTN 28 or another radiotelephone (not shown).

Briefly, the radiotelephone 30 can be identified by the cellular system 18 by data stored in memory locations in the radiotelephone. Each radiotelephone includes a programmable memory location which contains a unique identification number assigned by the cellular system. This unique identification number is the equivalent of a conventional telephone number, and is preferably a 10 digit number known as the Mobile Identification Number ("MIN"). Because the MIN is assigned by the cellular system, the radiotelephone 30 must be programmed with an MIN of the cellular system's choosing after the phone is purchased and before the radiotelephone can be used. Once the radiotelephone is programmed, the MIN is used by the cellular system to route calls to the phone and to keep track of account information relating to the radiotelephone. When a typical radiotelephone is manufactured, the programmable memory location does not contain meaningful data.

Each radiotelephone also includes a non-programmable memory location which contains a unique telephone serial number. This serial number can also be used to identify the telephone, and is preferably the Electronic Serial Number ("ESN"). The ESN for each phone is stored in the non-programmable memory location when the radiotelephone is manufactured. The ESN is an 11 digit number required by the FCC which identifies the manufacturer of the radiotelephone and the model, as well as providing a unique serial number for the radiotelephone.

Figure 2:
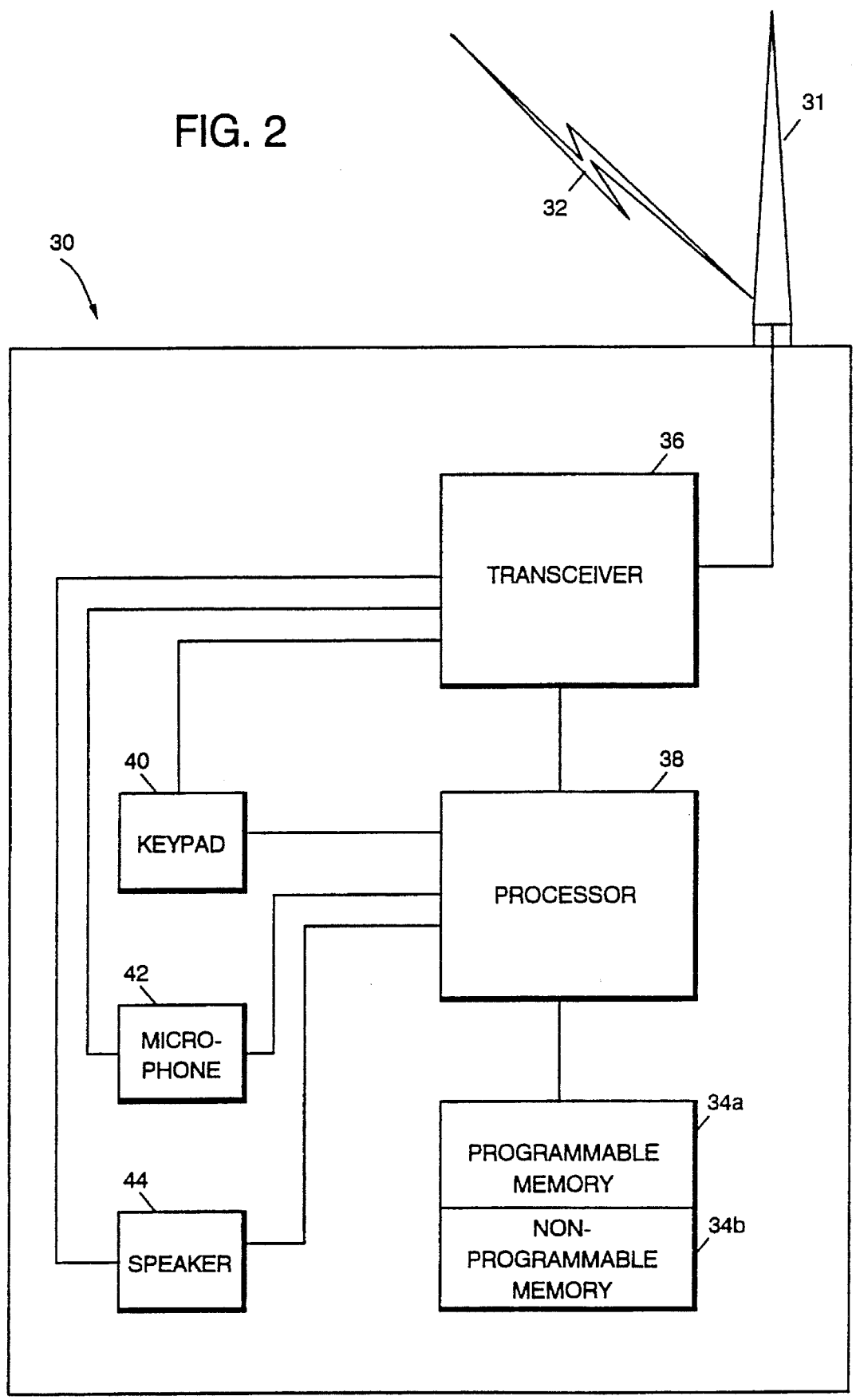
FIG. 2 illustrates a cellular radiotelephone according to the system of FIG. 1.

In one embodiment, the radiotelephone 30 of the present invention includes a memory, including a programmable memory location $34_A$ and a non-programmable memory location $34_B$, as shown in FIG. 2. The ESN for the radiotelephone is preferably stored in the non-programmable memory location $34_B$ when the radiotelephone is manufactured. In the most preferred embodiment, the least significant 10 digits of the ESN are stored in a portion of the programmable memory location $34_A$ when the radiotelephone is manufactured, and the resulting number is known as the initial identification number. As will be understood by those having skill in the art, other numbers may be used for the initial identification number as long as each manufactured phone has a relatively unique initial identification number. This programmable memory location $34_A$ can later be programmed with an MIN designated by a cellular system.

The radiotelephone also includes a transceiver 36 for transmitting and receiving cellular radiotelephone communications signals to and from a base station. The cellular communications signals are transmitted and received from the antenna 31 over the wireless communication path 32 and preferably conform to IS-136 standards. A processor 38 may control the operation of the radiotelephone and provide an interface between the other elements of the radiotelephone. The radiotelephone may also include a keypad 40, a microphone 42, and a speaker 44.

The processor 38 preferably includes a memory programming function for programming the programmable memory location $34_A$ in response to receipt of an MIN from the transceiver 36. Accordingly, the radiotelephone 30 can be activated or programmed remotely in response to cellular radiotelephone communication signals generated by the cellular system. The cellular system transmits cellular communication signals including the initial identification number so that the radiotelephone knows to accept the communication including programming information. The communication signals also include the desired MIN, chosen by the cellular system, which is received by the transceiver 36 and written into the programmable memory location $34_A$ by the processor 38. These communication signals may be transmitted by the cellular system in the form of a page which is received by the transceiver. The page preferably comprises a Short Message Service ("SMS") data string provided on a Digital Control Channel ("DCC") according to the TIA/EIA IS-136 standard. Accordingly, the SMS data string may include up to 239 octets (or bytes) which can be formatted as characters of alpha-numeric data.

The activation process may be initiated by the radiotelephone 30 by first initiating a cellular radiotelephone communication to the cellular system. Accordingly, the transceiver 36 may include an activation function for establishing a cellular radiotelephone communication from the radiotelephone 30 to the cellular system before the telephone is programmed. This activation function allows the transceiver 36 to transmit the initial identification number to the cellular system. The cellular system can use the initial identification number to identify the radiotelephone 30 after an account has been set up, and the MIN has been chosen, as discussed above. The activation function may also allow the transceiver to transmit the ESN to the cellular system.

The cellular radiotelephone communication used to initiate the activation process can be established by manually dialing a predetermined telephone number from the radiotelephone. Alternately, the radiotelephone communication can be automatically initiated by the radiotelephone at the initial power up. For example, a boolean variable in a programmable memory location can be used to indicate that the radiotelephone is in a programmed or unprogrammed state. If the boolean variable indicates that the radiotelephone has not been programmed, the radiotelephone automatically-establishes a cellular radiotelephone communication, using a previously stored activation number, to initiate the activation process when turned on or when the send button is pressed. This approach allows the phone to be activated with reduced user intervention.

If the activation process is initiated by the radiotelephone 30, the transceiver may also include an information function allowing the radiotelephone to transmit information requested by the cellular system. This information may include account information such as billing information, service information, the user's name, the user's address, credit information, and other user information. This information may be supplied to the transceiver through either the keypad 40 or microphone 42.

Figure 3:
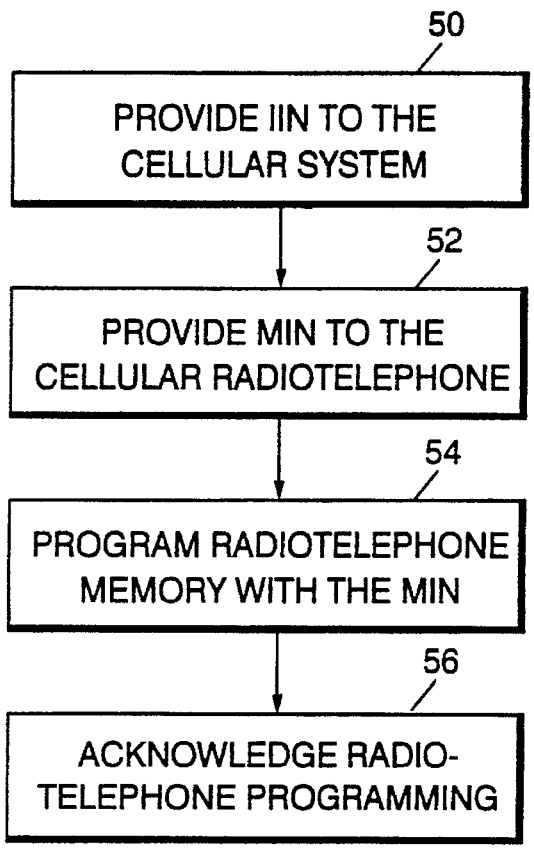
FIG. 3 is a flowchart which illustrates operations for programming a cellular radiotelephone according to the present invention.

Referring to FIG. 3, operations for activating a radiotelephone 30 by remote programming are shown in flowchart form. This radiotelephone 30 has a programmable memory location $34_A$ which is programmed by the manufacturer with a relatively unique initial identification number. The initial identification number may include predetermined digits chosen from the ESN, such as the least significant 10 digits of the ESN.

Figure 4:
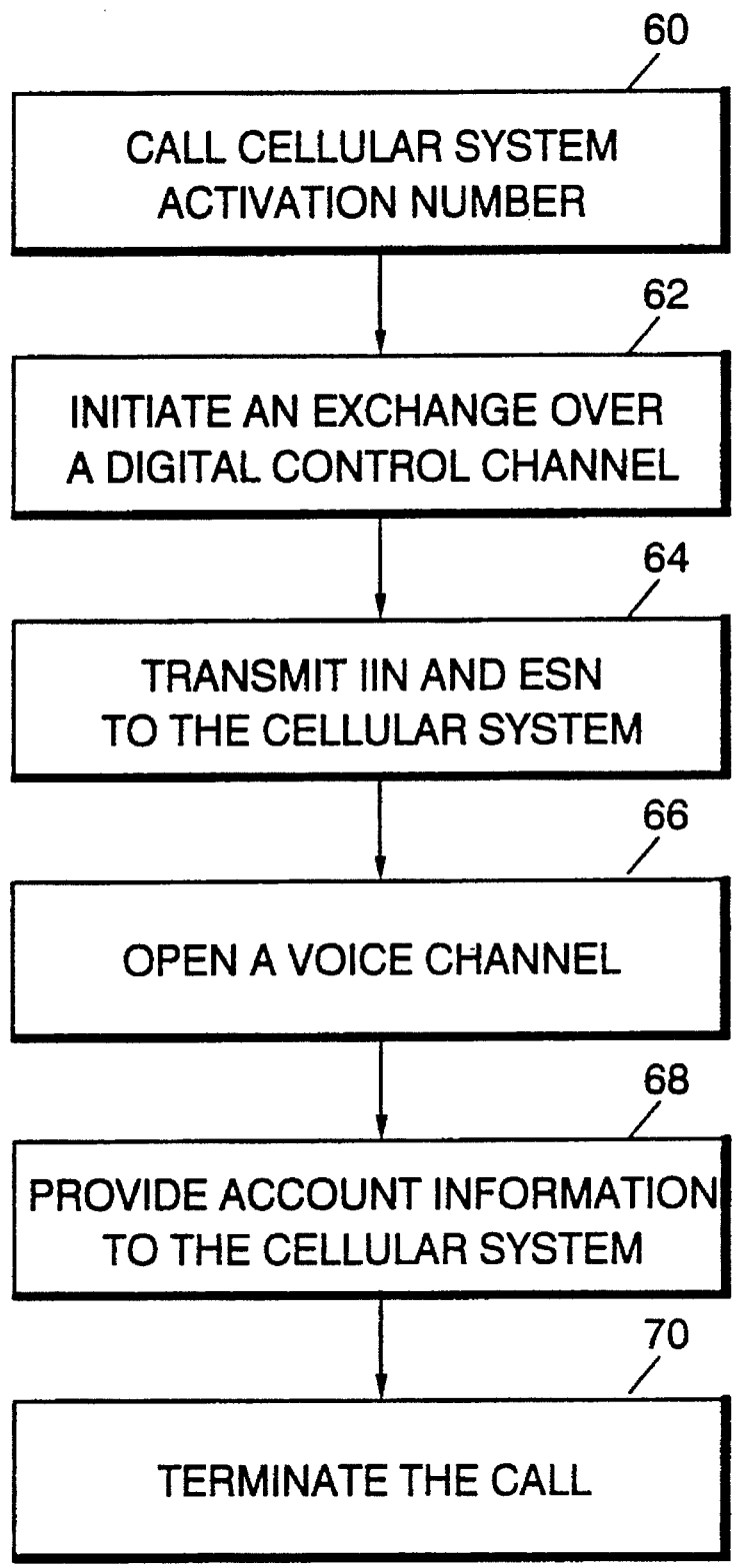
FIG. 4 is a flowchart which illustrates operations for providing information to the cellular system according to FIG. 3.

When phone activation is desired, the initial identification number ("IIN") is provided at block 50 to the cellular system. Preferably, a first cellular radiotelephone communication is established from the radiotelephone 30 to the cellular system 18, and the initial identification number is transmitted to the cellular system, as shown in FIG. 4. This may be accomplished by calling a designated unblocked activation number at block 60 which will accept calls from phones which have not been activated or programmed and therefore have no established account. This call initiates an exchange over a digital control channel at block 62 wherein the initial identification number is transmitted at block 64 to the cellular system via the wireless communications path 32 and the base station $20_A$. The ESN may also be transmitted at block 64 over the digital control channel. The ESN may be compared to the initial identification number to insure that the phone has not been previously programmed.

The cellular system may then open a voice communications channel at block 66, and communications between the phone and the cellular system switch to the designated voice channel which is implemented over the wireless communications path 32. At this point, voice communications may occur between the radiotelephone user and the activation center 27. An operator or recording can prompt the user to provide any account information at block 68 required to establish a cellular radiotelephone account. This account information may include the user's name, address, credit information, credit card numbers, billing information, service information, etc. Once this information is obtained, the radiotelephone communication can be terminated at block 70, and the cellular system can process this information. Because the phone is programmed with the initial identification number, and this number has been provided to the cellular system, the cellular system can call the phone back at a later time to program (or activate) the phone. Accordingly, the user does not have to wait on the phone for the cellular system to establish the account. Alternately, the account information can be entered through the keypad.

Figure 5:
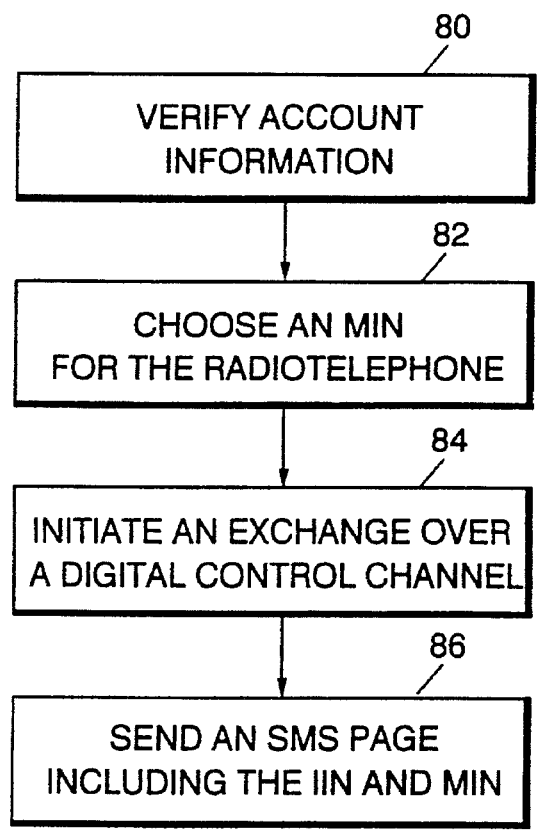
FIG. 5 is a flowchart which illustrates operations for providing an MIN to the radiotelephone according to the present invention.

The cellular system must next determine the MIN and provide the MIN at block 52 of FIG. 3 to the radiotelephone. This operation is shown in greater detail in FIG. 5. The cellular system may run automated or manual credit checks and verify account information at block 80. If the cellular system decides to establish an account for the new radiotelephone 30, an MIN is chosen at block 82, and all relevant account information can be stored in the subscriber data base 24. Then, a second cellular radiotelephone communication is established over the wireless communication path 32 from the cellular system to the radiotelephone 30 using the initial identification number to identify the radiotelephone, and the MIN is transmitted to the radiotelephone. This communication is preferably established by initiating an exchange over a DCC at block 84. The second cellular communication is preferably a page comprising an SMS data string according to the IS-136 standard.

The SMS data string may be provided on a digital control channel and includes the IIN and MIN at block 86. The SMS data string may also include any other phone configuration parameters, as well as other Number Assignment Module ("NAM") parameters such as the Public Service ID ("PSID"), the Residential Service ID (RSID"), etc. The SMS data string may include up to 293 characters originating from the activation center 26 and transmitted from the base station $20_A$ according to the TIA/EIA IS-136 standard.

The programmable memory location is then programmed with the MIN at block 54 in FIG. 3, and the radiotelephone is ready for normal operation. The page is preferably received by the radiotelephone transceiver 36, as discussed above. Data within the page identifies the MIN and signals the processor 38 in the phone to program the programmable memory location $34_A$ with the MIN. Methods of remote programming are disclosed, for example, in U.S. Pat. No. 5,301,223 entitled "Cellular Telephone System with Remote Programming, Voice Responsive Registration and Real Time Billing" to Amadon et al., and U.S. Pat. No. 5,297,192 entitled "Method and Apparatus for Remotely Programming a Mobile Data Telephone Set" to Gerszberg. The disclosures of both of the above mentioned patents are hereby incorporated in their entirety herein by reference. The cellular system may wait for a response at block 56 from the radiotelephone 30 indicating successful programming before storing account information in a subscriber database such as a Home Location Register ("HLR") subscriber database. If no response is received, SMS data may be retransmitted.

When the programming step has been completed, the cellular system may automatically initiate a call to the phone to verify proper programming. This call may also be used to indicate to the user that the phone is operational. When the user answers this call, a recorded message may state that the phone is now operational. Alternately, a predetermined signal on the phone such as a tone or a light may indicate that the phone has been programmed. This signal may also be initiated by the page used to program the phone.

The use of these operations eliminates the need to have a technician program a new cellular radiotelephone prior to use. The user can purchase a cellular radiotelephone; call the activation number and provide the required information; and then put the phone away until the page is sent to program the phone. Accordingly, the user does not need to wait for the phone to be programmed in order to leave the dealer with the phone after having purchased the phone.

Furthermore, these operations can be implemented using existing cellular system operating standards reducing the need to develop new hardware to support this method of remote programming. The use of an SMS page would be virtually transparent to existing systems.

In a particular embodiment of the method according to the present invention, the radiotelephone 30 initiates a call to the cellular system using a predetermined activation number to access the activation center. In this embodiment, the activation center and the message center are separate units within the cellular system which are linked by a communications line. For example, an X.400 protocol running on top of a Transmission Control Protocol/Internet Protocol ("TCP/IP") or an asynchronous dialup connection can be used. Alternately, the activation center and message center can be implemented in a single unit. The activation number allows an un-programmed radiotelephone to access the activation center. The radiotelephone 30 first accesses a base station $20_A$ on a DCC. Identification numbers and other data from the memory of the radiotelephone may be transmitted to the cellular system over the DCC, allowing the cellular system to compare the ESN and initial identification number to verify that the phone has not been previously programmed.

In an un-programmed radiotelephone 30 according to the present invention, the initial identification number comprises predetermined digits of the ESN and is stored in the programmable memory location in which the MIN will later be programmed. In addition, a flag may be set in another programmable memory location to indicate that the radiotelephone has not been programmed. Accordingly, the cellular system can determine whether to allow access to the activation center. In addition, the cellular system can determine whether any previous attempts have been made to program a radiotelephone using the initial identification number. Any previous attempts may be disregarded.

Communications are then established between the un-programmed phone and the activation center. If an Integrated Services Digital Network ("ISDN") User Part ("ISUP") is used to trunk the call some combination of the Numbering Plan Area (area code) ("NPA-NXX") and MIN/ESN or the Mobile Switching Center Identification ("MSCID") and the MIN/ESN are used for the calling party number field. Otherwise, the Feature Group D, Account Number Identification ("FG-D ANI") field is used to convey the user's address. Interactive voice response units combined with live operators may prompt the user to enter required account information. Once the information has been entered, the call is terminated.

After validating the account information supplied by the user over the radiotelephone and choosing a MIN for the radiotelephone, the activation center submits a short (prioritized) message to the local message center. This short message may be submitted by either a dial-up asynchronous connection or X.400 transaction. The short message encapsulates Number Assignment Module ("NAM") program elements including the assigned MIN on the SMS teleservice level. The user's initial identification number received at the activation center is passed as the dialed digits for the submitted short message.

If the activation center saved the Mobile Switching Center Identification ("MSCID") identifying the MSC from which the radiotelephone 30 called, the message center may route the short message as an SMS page directly back to that base station. Alternately, the message center may route the SMS page to every base station in the cellular system. Accordingly, the radiotelephone may be programmed even if the phone is moved from the cell in which it was located when the call was placed to the activation center. If a base station transmits a page and the radiotelephone does not respond, this information can be relayed to the activation center.

When an SMS page is received by a base station from the message center, the base station will transmit the SMS page with the initial identification number to identify the radiotelephone to be programmed and the assigned MIN to be programmed. The assigned MIN may be transmitted as an R-Data portion of the SMS page. If the radiotelephone successfully receives the SMS page and programs the MIN portion into the appropriate programmable memory location, the radiotelephone may transmit a response indicating that the programming was successful. This response can be transmitted from the base station back to the activation center, where commands can be initiated to save the account information for the successfully programmed radiotelephone in the HLR portion of the subscriber data base 24. The transmission of the response from the base station back to the activation center can be accomplished according to the TIA/EIA IS-41C standard.

In this embodiment, autonomous terminal registration may be disabled for the radiotelephone being programmed from the time that the SMS page is transmitted from the base station to the time that the account information is programmed in the HLR. Accordingly, the base station can handle the page to the un-programmed radiotelephone.

In addition, a flag in a programmable memory location of the radiotelephone may be set to indicate that the phone has been programmed for use with a cellular system. Accordingly, if the attempted programming is unsuccessful, the programming may be re-initiated, and the flag will indicate that the phone has not yet been programmed. The flag may comprise a programmable memory location in the radiotelephone which is programmed to a first boolean value when the phone is manufactured to indicate that the phone has not been programmed, and which is programmed to a second boolean value by the processor within the radiotelephone to indicate that the radiotelephone has been successfully programmed.

In addition, the use of E212 addresses or optional subaddress capabilities may simplify the method by allowing more digits for both routing and uniquely identifying the radiotelephone. Optionally, the dialed digit (called party) field can be used on the air-interface to convey more information about the desired call routing. Furthermore, digits can be added to the initial identification number. This can be done by using a non-assigned Numbering Plan Area ("NPA") value.

Alternately, the HLR of the subscriber database can be involved at the beginning. The first communication from the radiotelephone to the cellular system can trigger an interrogation of the HLR which then compares the ESN and the initial identification number to determine if programming is required. Furthermore, Intelligent Network ("IN") concepts can be used to initiate the programming method. The MSC can initiate an origination request to the HLR and Service Control Point ("SCP") which then command the MSC to switch the call to an Interactive Intelligent peripheral Voice Response ("IVR IP") to collect user information.

In the drawings and specification, there have been disclosed typical preferred embodiments of the invention, and although specific terms are employed, they are used in a generic and descriptive sense only and not for purposes of limitation, the scope of the invention being set forth in the following claims.

That which is claimed:

1. A method for remotely programming a cellular radiotelephone which includes a programmable memory location which is programmed with a unique initial identification number, said remotely programming method comprising the steps of:

providing said initial identification number to a cellular system;

establishing a page from said cellular system to said radiotelephone using said initial identification number to identify said radiotelephone;

transmitting data to said radiotelephone during said page, wherein said data comprises a mobile identification number; and reprogramming said programmable memory location so that said programmable memory location is programmed with said mobile identification number.

2. A method according to claim 1 wherein said data comprises a Short Message Service data string.

3. A method according to claim 2 wherein said Short Message Service data string comprises a data format defined by the IS-136 air interface standard and the IS-41C network standard.

4. A method according to claim 1 wherein said providing step comprises the steps of:

establishing a cellular radiotelephone communication from said radiotelephone to the cellular system;

transmitting said initial identification number to said cellular system; and terminating said first cellular radiotelephone communication.

5. A method according to claim 1 wherein said radiotelephone comprises a non-programmable memory location for storing a unique telephone serial number, wherein said initial identification number comprises predetermined digits chosen from said telephone serial number.

6. A method according to claim 5 wherein said telephone serial number comprises an electronic serial number (ESN) of said radiotelephone.

7. A method according to claim 5 wherein said providing step further comprises the step of providing said telephone serial number to said cellular system, and said providing step is followed by the step of comparing said telephone serial number and said initial identification number.

8. A method according to claim 1 wherein said providing step further comprises providing account information to said cellular system.

9. A method according to claim 8 wherein said providing step is followed by the step of establishing a cellular service account for said radiotelephone.

10. A method for remotely programming a cellular radiotelephone which includes a programmable memory location which is programmed with a unique initial identification number, said remotely programming method comprising the steps of:

establishing a first cellular radiotelephone communication from said radiotelephone to a cellular system;

transmitting said initial identification number to said cellular system during said first cellular radiotelephone communication;

terminating said first cellular radiotelephone communication;

establishing a second cellular radiotelephone communication from said cellular system to said radiotelephone using said initial identification number to identify said radiotelephone;

transmitting a mobile identification number to said radiotelephone during the second cellular radiotelephone communication; and reprogramming said programmable memory location so that said programmable memory location is programmed with said mobile identification number.

11. A method according to claim 10 wherein said radiotelephone further comprises a non-programmable memory location for storing a unique telephone serial number, wherein said initial identification number comprises predetermined digits chosen from said telephone serial number.

12. A method according to claim 11 wherein said telephone serial number comprises an electronic serial number (ESN) of said radiotelephone.

13. A method according to claim 11 wherein said first transmitting step further comprises the step of transmitting said radiotelephone serial number to said cellular system during said first cellular radiotelephone communication, and said first transmitting step is followed by the step of comparing said radiotelephone serial number and said initial identification number.

14. A method according to claim 10 wherein said first transmitting step further comprises transmitting account information to said cellular system.

15. A method according to claim 14 wherein said first transmitting step is followed by the step of establishing a cellular service account for said radiotelephone.

16. A method according to claim 10 wherein said second cellular radiotelephone communication comprises a page.

17. A method according to claim 16 wherein said second transmitting step comprises the step of transmitting a Short Message Service data string to said radiotelephone, wherein said Short Message Service data string comprises said mobile identification number.

18. A method according to claim 16 wherein said Short Message Service data string comprises a data format defined by the IS-136 air interface standard and the IS-41C network standard.

19. A method according to claim 10 wherein said cellular radiotelephone includes a second programmable memory location which is programmed to a first boolean value indicating that the first programmable memory location is programmed with the initial identification number, and wherein said reprogramming step is followed by the step of reprogramming said second programmable memory location to a second boolean value.

20. A method according to claim 10 wherein said reprogramming step is followed by the step of transmitting a response to said cellular system to indicate successful reprogramming of said programmable memory location.

21. A remotely programmable cellular radiotelephone comprising:

a non-programmable memory location for storing a unique telephone serial number;

a programmable memory location programmed with an initial identification number wherein said initial identification number comprises predetermined digits chosen from said telephone serial number;

transceiver means for transmitting and receiving cellular radiotelephone communication signals to and from a cellular system; and programming means for reprogramming said programmable memory location in response to receipt of a mobile identification number from said transceiver means so that said programmable memory location is programmed with said mobile identification number.

22. A remotely programmable cellular radiotelephone according to claim 21 wherein said unique telephone serial number is an electronic serial number (ESN) of said radiotelephone.

23. A remotely programmable cellular radiotelephone according to claim 22 wherein said initial identification number comprises the 10 least significant digits of said electronic serial number.

24. A remotely programmable cellular radiotelephone according to claim 21 wherein said transceiver means comprises means for establishing a cellular radiotelephone communication from said radiotelephone to said cellular system, and means for transmitting said initial identification number to said cellular system during said cellular radiotelephone communication.

25. A remotely programmable cellular radiotelephone according to claim 24 wherein said transceiver means further comprises means for transmitting said unique radiotelephone serial number.

26. A remotely programmable cellular radiotelephone according to claim 24 wherein said transceiver means further comprises means for transmitting account information to said cellular system.

27. A remotely programmable cellular radiotelephone according to claim 21 wherein said transceiver means comprises page receiving means for receiving a page from said cellular system, wherein said radiotelephone is identified by said initial identification number and said page comprises said mobile identification number.

28. A remotely programmable cellular radiotelephone according to claim 27 wherein said page comprises a Short Message Service data string.

29. A remotely programmable cellular radiotelephone according to claim 28 wherein said Short Message Service data string comprises a data format defined by the IS-136 air interface standard and the IS-41C network standard.

30. A remotely programmable cellular radiotelephone according to claim 21 further comprising,
- a second programmable memory location programmed with a first boolean value, and
- flagging means for reprogramming said second programmable memory location in response to the reprogramming of said first programmable memory location so that said second programmable memory location is programmed with a second boolean value.

* * * * *

UNITED STATES PATENT AND TRADEMARK OFFICE
CERTIFICATE OF CORRECTION

PATENT NO. : 5,603,084 C1
DATED : June 5, 2001
INVENTOR(S) : Henry, Jr. et al.

Page 1 of 1

It is certified that error appears in the above-identified patent and that said Letters Patent is hereby corrected as shown below:

Column 2,
Line 66, should read as follows: -- of reprogramming said second programmable memory location to a --

Signed and Sealed this

Twenty-fourth Day of February, 2004

JON W. DUDAS
*Acting Director of the United States Patent and Trademark Office*

US005603084C1

(12) REEXAMINATION CERTIFICATE (4372nd)

United States Patent
Henry, Jr. et al.

(10) Number: US 5,603,084 C1
(45) Certificate Issued: Jun. 5, 2001

(54) METHOD AND APPARATUS FOR REMOTELY PROGRAMMING A CELLULAR RADIOTELEPHONE

(75) Inventors: Raymond C. Henry, Jr., Raleigh, NC (US); Alan E. Sicher, Garland, TX (US); Anthony J. Sammarco, Garner, NC (US); Michael Parker; William R. Osborn, both of Gary, NC (US)

(73) Assignee: Ericsson Inc., Research Triangle Park, NC (US)

Reexamination Request:
No. 90/004,949, Mar. 26, 1998

Reexamination Certificate for:
Patent No.: 5,603,084
Issued: Feb. 11, 1997
Appl. No.: 08/397,583
Filed: Mar. 2, 1995

(51) Int. Cl.⁷ ....................................................... H04Q 7/00
(52) U.S. Cl. .................. 455/419; 455/186.1; 455/186.2; 455/551
(58) Field of Search .................................... 455/418, 419, 455/420, 186.1, 186.2, 551, 575

(56) References Cited

U.S. PATENT DOCUMENTS

| | | | |
|---|---|---|---|
| 5,484,505 | 1/1996 | Norman et al. | 379/58 |
| 5,485,505 | 1/1996 | Norman et al. | 379/58 |
| 5,594,782 | 1/1997 | Zicker et al. | 79/63 |
| 5,613,214 | 3/1997 | Shirasawa et al. | 455/54.1 |
| 5,615,267 | 3/1997 | Lin et al. | 380/23 |
| 5,668,875 | 9/1997 | Brown et al. | 380/23 |
| 5,878,339 * | 3/1999 | Zicker et al. | 455/419 |

FOREIGN PATENT DOCUMENTS

| | | |
|---|---|---|
| 2 249 459 | 5/1992 | (GB). |
| WO94/30023 | 6/1994 | (WO). |
| WO96/27270 | 2/1996 | (WO). |

OTHER PUBLICATIONS

EIA/TIA–553 Standard, "Mobile Station—Land Station Compatibility Specification," Sep. 1989.
EIA/TIA–IS–91 Interim Standard, "Mobile Station—Base Station Compatibility Standard for 800 MHz Analog Cellular," Oct. 1994.
Newton's Telecom Dictionary, eighth edition, 1994.
IBM Dictionary of Computing, tenth edition, 1994.
Holley, Kevin, *The GSM Short Message Service*, pp. 7/1–7/5 (1991).
*Southwestern Bell Cellular Service System Description*, pp. 13–14 (1985).

* cited by examiner

*Primary Examiner*—Edward F. Urban

(57) ABSTRACT

A cellular radiotelephone which includes a programmable memory location which is programmed with a unique initial identification number is remotely programmed by providing the initial identification number to a cellular system, and establishing a page from the cellular system to the radiotelephone using the initial identifiation number to identify the radiotelephone. Data, including a mobile identification number, is transmitted during the page, and the programmable memory location is programmed with the mobile identification number. Accordingly, the radiotelephone can be conveniently programmed after purchase from a remote location. In addition, the initial identification number may comprise predetermined digits chosen from the electronic serial number.

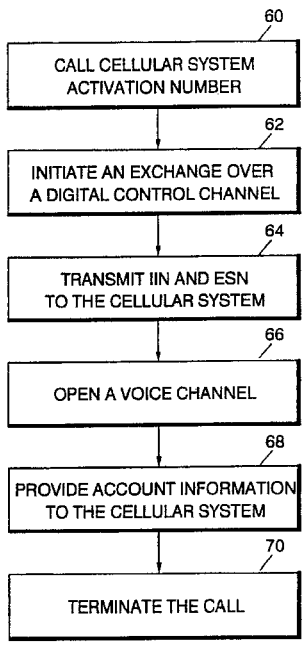

US 5,603,084 C1

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 21, 22, 23, 24, 25, 26 and 30 is confirmed.

Claim 10 is cancelled.

Claims 1, 7, 11, 13, 14, 16, 19, 20 and 27 are determined to be patentable as amended.

Claims 2, 3, 4, 5, 6, 8, 9, 12, 15, 17, 18, 28 and 29, dependent on an amended claim, are determined to be patentable.

New claim 31 is added and determined to be patentable.

1. A method for remotely programming a cellular radiotelephone which includes a programmable memory location which is programmed with a unique initial identification number, said remotely programming method comprising the steps of:
providing said initial identification number *from said programmable memory location* to a cellular system;
establishing a page from said cellular system to said radiotelephone using said initial identification number *from said programmable memory location* to identify said radiotelephone;
transmitting data to said radiotelephone during said page, wherein said data comprises a mobile identification number; and
reprogramming said programmable memory location *without manual intervention* so that said programmable memory location is programmed with said mobile identification number *transmitted during said page*.

7. A method according to claim 5 wherein said providing step further comprises the step of providing said telephone serial number to said cellular system, and said providing step is followed by the steps of comparing said telephone serial number and said initial identification number *and determining whether the radiotelephone has been previously programmed based on a result of the comparison*.

11. [A method according to claim 10 wherein said radiotelephone further comprises] *A method for remotely programming a cellular radiotelephone which includes a programmable memory location which is programmed with a unique initial identification number and a non-programmable memory location for storing a unique telephone serial number, said remotely programming method comprising the steps of:*
*establishing a first cellular radiotelephone communication from said radiotelephone to a cellular system;*
*transmitting said initial identification number to said cellular system during said first cellular radiotelephone communication wherein said initial identification number comprises predetermined digits chosen from said telephone serial number;*
*terminating said first cellular radiotelephone communication;*
*establishing a second cellular radiotelephone communication from said cellular system to said radiotelephone using said initial identification number to identity said radiotelephone;*
*transmitting a mobile identification number to said radiotelephone during the second cellular radiotelephone communication; and*
*reprogramming said programmable memory location so that said programmable memory location is programmed with said mobile identification number.*

13. A method according to claim 11 wherein said first transmitting step further comprises the step of transmitting said radiotelephone serial number to said cellular system during said first cellular radiotelephone communication, and said first transmitting step is followed by the steps of comparing said radiotelephone serial number and said initial identification number *and determining whether the radiotelephone has been previously programmed based on a result of the comparision*.

14. A method according to claim [10] *11* wherein said first transmitting step further comprises transmitting account information to said cellular system.

16. [A method according to claim 10] *A method for remotely programming a cellular radiotelephone which includes a programmable memory location which is programmed with a unique initial identification number, said remotely programming method comprising the steps of:*
*establishing a first cellular radiotelephone communication from said radiotelephone to a cellular system;*
*transmitting said initial identificaiton number from the programmable memory location to said cellular system during said first cellular radiotelephone communication;*
*terminating said first cellular radiotelephone communication;*
*establishing a second cellular radiotelephone communication from said cellular system to said radiotelephone using said initial identification number from the programmable memory location to identify said radiotelephone;*
*transmitting a mobile identification number to said radiotelephone during the second cellular radiotelephone communication* wherein said second cellular radiotelephone communication comprises a page *including said mobile identification number; and*
*reprogramming said programmable memory location without manual intervention so that said programmable memory location is programmed with said mobile identification number transmitted in said page.*

19. A method according to claim [10] *16* wherein said cellular radiotelephone includes a second programmable memory location which is programmed to a first boolean value indicating that the first programmable memory location is programmed with the initial identification number, and wherein said reprogramming step is followed by the step of reprogramming said programmable memory location to a second boolean value.

20. A method according to claim [10] *16* wherein said reprogramming step is followed by the step of transmitting a response to said cellular system to indicate successful reprogramming of said programmable memory location.

27. A remotely programmable cellular radiotelephone according to claim 21 wherein said transceiver means comprises page receiving means for receiving a page from said cellular system, wherein said radiotelephone is identified by *said page using* said initial identification number *from said programmable memory location* and said page comprises said mobile identification number *with which said programmable memory location is programmed without manual intervention.*

*31. A method according to claim 16 wherein said radiotelephone comprises a non-programmable memory location storing a telephone serial number wherein said unique initial identification number comprises predetermined digits chosen from said telephone serial number.*

\* \* \* \* \*